United States Patent

[11] 3,585,551

| [72] | Inventor | George Scourtes<br>Detroit, Mich. |
|---|---|---|
| [21] | Appl. No. | 813,895 |
| [22] | Filed | Apr. 7, 1969 |
| [45] | Patented | June 15, 1971 |
| [73] | Assignee | Wilson Engineering, Inc.<br>Saginaw, Mich. |

[54] LOAD CELL CONSTRUCTION
10 Claims, 3 Drawing Figs.

[52] U.S. Cl. .................................................. 336/30,
73/141, 336/134
[51] Int. Cl. .................................................. H01f 21/06
[50] Field of Search ........................................... 336/30,
130, 132, 134; 73/71.2, 71.4, 141 A

[56]  References Cited
UNITED STATES PATENTS

| 2,376,156 | 5/1945 | Kuehni | 336/30 X |
| 2,570,672 | 10/1951 | Hathaway | 336/30 |
| 2,643,869 | 6/1953 | Clark | 336/30 X |
| 3,052,858 | 9/1962 | Darlington | 336/30 |
| 3,218,590 | 11/1965 | Gerstine | 336/30 |

FOREIGN PATENTS

| 969,884 | 5/1950 | France | 73/141 (A) |

Primary Examiner—Thomas J. Kozma
Attorney—Learman and McCulloch

ABSTRACT: A load cell comprising a cylindrical magnetic body provided with an axial bore therethrough and an annular groove in each end. Accommodated in each groove is an electrical winding and overlying each winding is a resilient, magnetic diaphragm. A tubular spacer is accommodated in the bore and abuts each of the diaphragms. The axial length of the body adjacent the bore is less than that adjacent the peripheral edge of the body so as to provide an axial gap between the body and each of the diaphragms. Force applying means is operable to deflect the diaphragms simultaneously axially of the body in either of two opposite directions so as to diminish the size of one gap and simultaneously enlarge the size of the other gap by an equal amount.

PATENTED JUN 15 1971 3,585,551

INVENTOR.
GEORGE SCOURTES
BY
Learman & McCulloch

LOAD CELL CONSTRUCTION

This invention relates to a load cell construction of the kind especially adapted to measure electrically either compressive or tensile loads imposed on the cell. The apparatus functions in response to changes in the reluctance of two magnetic circuits.

Load cells operable in response to changes in reluctance of magnetic circuits have been proposed heretofore, but known constructions have been subject to one or more disadvantages. For example, and regardless of whether the known constructions are capable of measuring compressive forces only, tensile forces only, or both compressive and tensile forces, inaccurate measurement of the applied load results unless the load is applied along a line which is virtually coaxial of the cell. That is, the known constructions are not immune from inaccuracies caused by laterally applied forces.

Others of the known load cells are subject to still other disadvantages, such as variations in reliability in response to changes in temperature, the inability to be adjusted for the accommodation of widely varying load factors, the likelihood of damage due to overloads, high manufacturing and maintenance costs, and complexity of assembly.

An object of this invention is to provide a load cell construction which overcomes the disadvantages referred to above.

Another object of the invention is to provide a load cell construction which is immune from side thrusts and thus is capable of measuring accurately the actual compressive or tensile components of loads imposed on the cell.

A further object of the invention is to provide a load cell constructed of common, easily manufactured and assembled parts, thereby minimizing initial, assembly and maintenance costs.

Another object of the invention is to provide a load cell construction which quickly and simply may be converted from one capable of optimum use with loads of a given magnitude to one capable of optimum use with loads of greatly differing magnitudes.

Other objects and advantages of the invention will be pointed out specifically or will become apparent from the following description when it is considered in conjunction with the appended claims and the accompanying drawing, in which:

Figure 1:
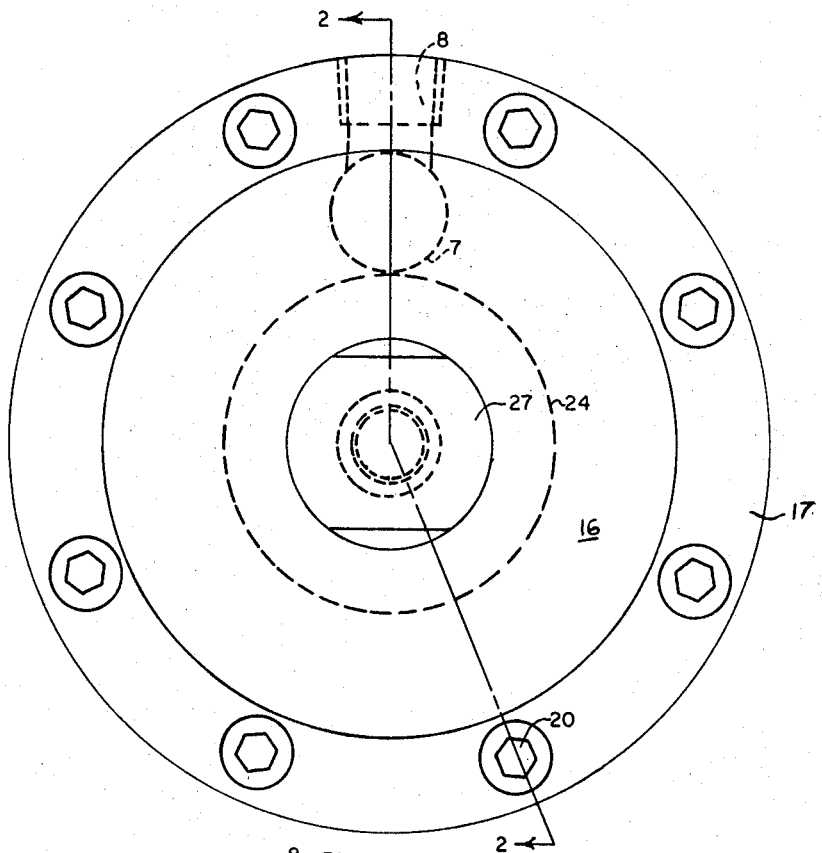
FIG. 1 is an end elevational view of one end of a load cell constructed in accordance with the invention.
Figure 3:
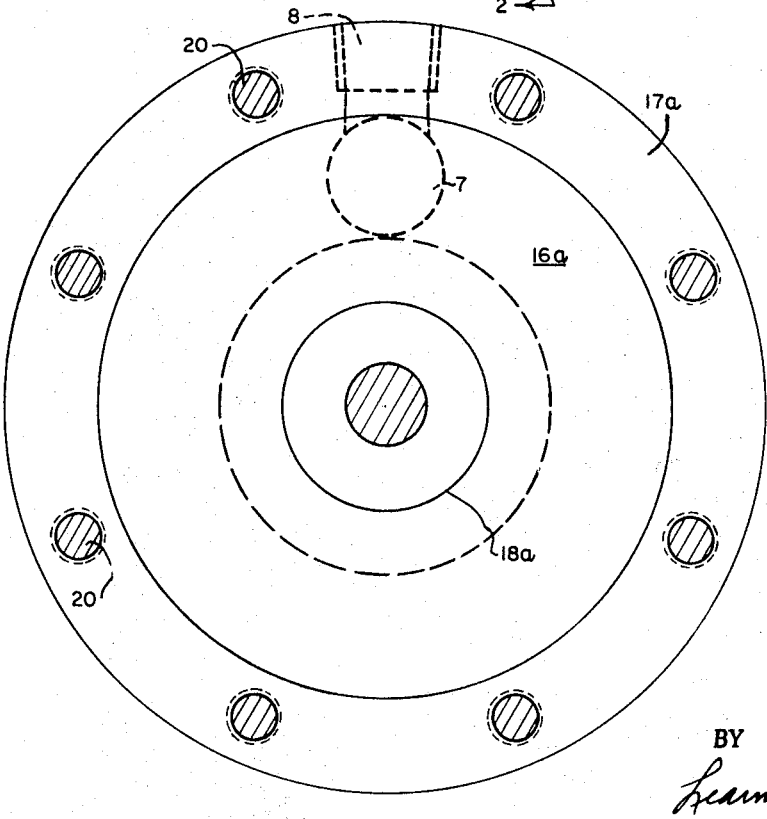
FIG. 3 is a sectional view taken on the line 3–3 of FIG. 2.

Apparatus constructed in accordance with the invention comprises a cylindrical body 1 formed of magnetic material such as soft, cold-rolled steel and having an axially extending bore 2 therethrough. In one end of the body is an annular groove 3 in which is accommodated an electrical winding or coil 4. In the opposite end of the body is a similar annular groove 5 which accommodates a similar winding 6 having the same number of turns as the winding 4. At one side of the body is a chamber 7 which establishes communication between the grooves 3 and 5. An internally threaded opening 8 in the wall of the body 1 communicates with the chamber 7 and is adapted to receive a correspondingly threaded coupling (not shown). The coils 4 and 6 are connected in series by leads 10 and 11. The other leads 12 and 13 are connected to the other ends of the coils 4 and 6 and are adapted to pass through the opening 8 for connection to a conventional bridge and meter circuit designated generally by the reference character C.

At one end of the body 1 is a resilient, magnetic diaphragm 14 formed of magnetic material such as spring tempered tool steel. In one side of the diaphragm 14 is an annular groove 15, but the opposite side has a smooth, flat surface 16. The groove 15 provides the diaphragm with a radially outer rim 17 and a radially inner boss 18 of uniform cross-sectional thickness joined by a flexible web 19 of substantially lesser thickness.

The diameter of the diaphragm 14 corresponds to the diameter of the body 1 and is fitted to one end of the latter with the smooth surface 16 confronting the end of the body 1. The diaphragm 14 removably is secured to the body by a plurality of threaded bolts 20 which are accommodated in openings provided in the body 1. Preferably, the bolts 20 extend completely through the body 1 for a purpose presently to be explained.

At the opposite end of the body 1 is another diaphragm 14a which is identical in all respects to the diaphragm 14. Those parts of the diaphragm 14a which correspond to parts of the diaphragm 14 are identified by similar reference characters, followed by the suffix a.

The diaphragm 14a is fitted to the adjacent end of the body 1 and its smooth surface 16a confronts the smooth surface of the diaphragm 14. The diaphragm 14a removably is secured to the body 1 by means of a baseplate 21 having threaded openings 22 adapted to receive the threaded ends of the bolts 20.

The grooves 3 and 5 in the body 1 provide radially outer rim portions 23 and radially inner boss portions 24 the opposite ends of which are flat. The diaphragms 14 and 14a seat on the opposite ends of the radially outer rim portions 23, but the opposite ends of the radially inner portions 24 are cut away so that the axial length of the body between the inner portions 24 is less than that between the radially outer portions 23. Consequently, a gap G exists between the diaphragm 14 and the adjacent boss 24 and an identical gap G' exists between the diaphragm 14a and the adjacent end of the radially inner body portion 24. The width of each gap preferably is about 0.010 inch.

Accommodated in the bore 2 of the body 1 is a motion transmitting member comprising a tubular spacer or sleeve 25 formed of nonmagnetic material and having a length corresponding to the axial length of the body between the radially outer rim portions 23. The spacer, therefore, is longer than the bore 2 by an amount equal to the sum of the two gaps G and G'. The opposite ends of the spacer 25 abut the confronting surfaces of the diaphragms 14 and 14a and maintain the latter a fixed distance apart. The spacer is of such size with respect to the size of the bore 2 as to be freely movable axially of the bore in either of two opposite directions.

Force applying means 26 is provided for applying compressive or tensile forces on the load cell and comprises a head 27 having a crowned surface 28 at one end and having a flat surface 29 at its other end which seats upon the boss 18 of the diaphragm 14. The force applying means includes a preferably nonmagnetic anchor bolt 30 accommodated in the sleeve 25 and extending through openings formed in the diaphragms, one end of the bolt being threaded into the head 27 and having at its other end a head 31 which seats against the boss 18a of the diaphragm 14a. The bolt 30, therefore, not only serves as an anchor for the member 26, but also couples the diaphragms 14 and 14a together for conjoint movement. At the same time, the bolt 30 maintains the diaphragms 14 and 14a in snug, abutting engagement with the associated ends of the spacer 25.

To condition the apparatus for operation, the cell is placed in such position as to have either compressive or tensile forces applied to the head 27. If the force is to be compressive, the object by means of which the force is applied may abut the surface 28 of the head 27. If the force is to be tensile, the object by means of which the force is applied may be coupled to the head 27 via an opening 32 in the head.

The bridge circuit C to which the leads 12 and 13 are connected will be connected to a suitable source of electrical energy, as is conventional, so as to establish a circuit in each of the windings 4 and 6 and a magnetic flux field in association with each winding.

As shown in the drawing a source of AC voltage is connected across the primary winding P of a transformer T. The terminals of the secondary windings are connected with the coils 4 and 6 by the leads 12 and 13, respectively. An alternating current voltmeter M is connected between a center tap of the secondary windings and the junction of the two leads 10 and 12. The arrangement is such that, when no force is applied to the head 27, the impedance of the two coils 4 and 6 is equal and hence the voltage drop across each coil is equal. Under these conditions, therefore, the meter M will indicate a state of equilibrium of the load cell.

As long as no force is applied to the head 27 the spacer 25 occupies a neutral position in which the gaps G and G' are equal. If a load is applied on the head 27 so as to move the latter to the right, as viewed in FIG. 2, the diaphragm 14 will be bowed or flexed to the right, thereby diminishing the gap G. The deflection of the diaphragm 14 will be transmitted to the diaphragm 14a via the spacer 25, thereby enlarging the gap G' by the same amount as the gap G is diminished. The magnetic reluctance associated with the gap G thereby will be decreased, whereas the magnetic reluctance associated with the gap G' will be increased. The impedance of the winding 6 will decrease while that of the winding 4 increases. Therefore, the voltage drop across the winding 6 will be less than that across the winding 4. The difference in the voltage drops will be directly proportional to the load and will be detected and indicated by the meter M.

Figure 2:
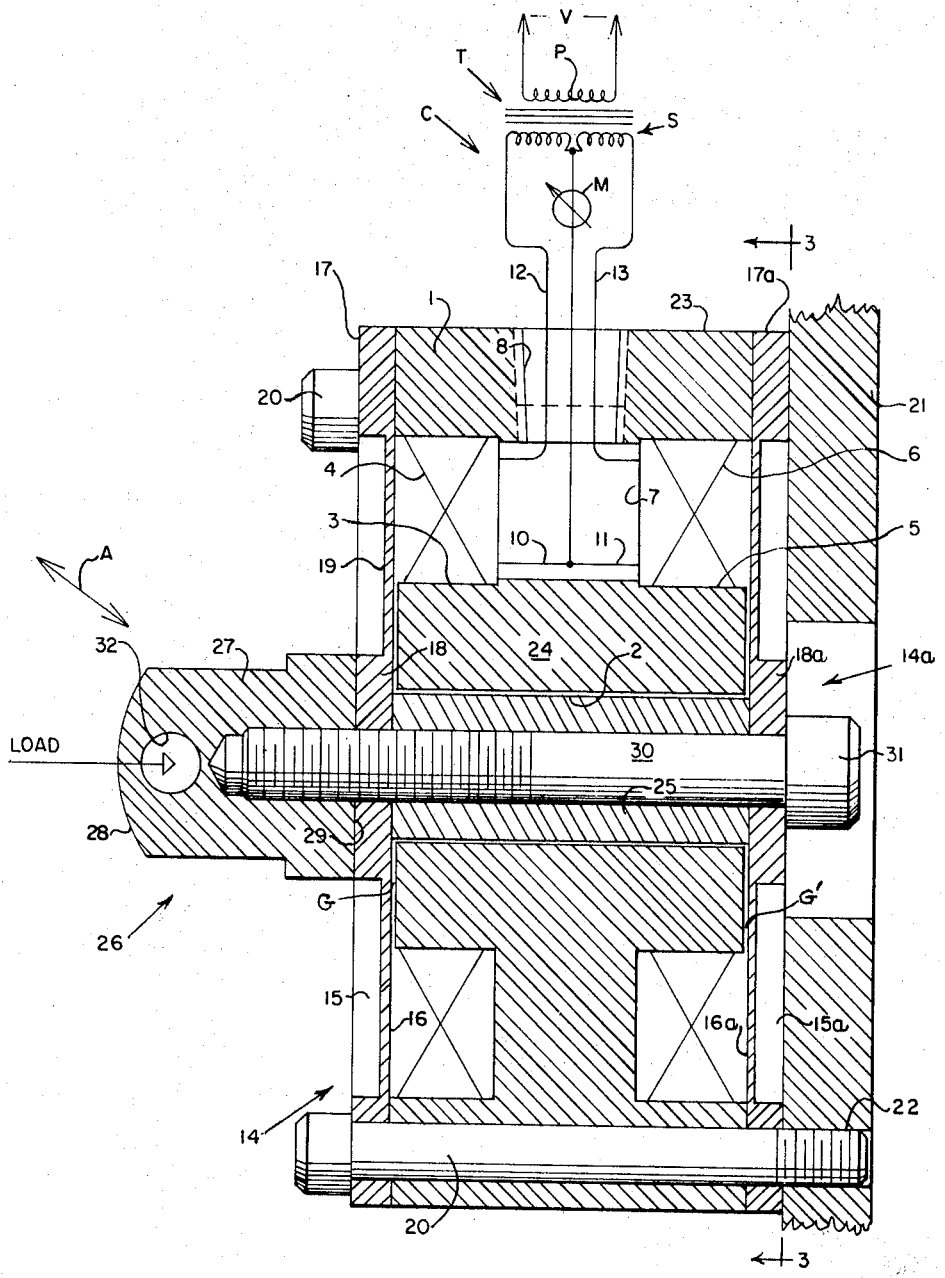
FIG. 2 is a sectional view taken on the line 2–2 of FIG. 1, and including a simplified schematic wiring diagram.

If the load applied to the head 27 is a tensile load such as to effect movement of the head 27 to the left, as viewed in FIG. 2, the effect will be to diminish the gap G' and enlarge the gap G. The voltage drops across the respective windings 4 and 6 thus will be different, and the difference will be directly proportional to the amount of the imposed load.

An important characteristic of the invention is its immunity from lateral or side thrust. To illustrate this characteristic of the apparatus, assume that a load is imposed obliquely on the member 27 in either direction along the line of the arrow A in FIG. 2. Such a load will be resolved into two components, one of which is axial of the body 1 and the other of which is lateral or transverse. The axial component will effect bowing or dishing of the diaphragms so as to diminish one gap and enlarge the other in the same manner as has been described previously.

The lateral component of the oblique force will tend to rock the assembly 26. For example, the head 27 may be rocked toward the left, in which case the bolthead 31 will be rocked toward the right. Rocking of the assembly 26 will cause some deflection or dishing of that portion of the diaphragm 14 which lies to the left of the head 27 and a corresponding deflection or dishing of that portion of the diaphragm 14a which lies to the right of the bolthead 31. Such deflections of the diaphragms 14 and 14a will be equal and opposite. That is, if the left-hand side of the diaphragm 14 is dished inwardly from the position shown in FIG. 2, the right-hand portion of the diaphragm 14a will be dished inwardly from the position shown in FIG. 2. Since the deflection of the diaphragm portions is equal and opposite, such dishing will cause no difference between the magnetic reluctance associated with the winding 4 and the magnetic reluctance associated with the winding 6. Consequently, the imposition of lateral forces on the load cell has no effect on the operation of the latter.

One of the most advantageous and significant characteristics of the apparatus is its ability to be converted quickly and easily from an instrument capable of measuring loads of a given magnitude to one capable of measuring loads of greatly differing magnitudes. For example, if the apparatus shown in the drawing has diaphragms especially adapted to measure a load having a magnitude of approximately 1,000 pounds, it would not be reliable for the measurement of loads of about 3,000 pounds. The apparatus can be converted to one adapted for use in measuring the higher magnitude load by removing the bolts 20 and replacing the diaphragms 14 and 14a with two other diaphragms which are identical to each other and which correspond to the diaphragms 14 and 14a except that the webs 19 and 19a will be thicker and thus stiffer or more rigid. The bolts 20 may then be replaced whereupon the instrument is adapted to operate as hereinbefore described.

Another significant characteristic of the apparatus is its ability to withstand substantial overload without injury. For example, if a force of excessive magnitude is applied to the head 26 in either direction, the diaphragms 16 and 16a will be deflected, but only until one or the other of the gaps G or G' is completely closed. When one of the gaps is closed, the associated diaphragm will be in engagement with the body portion 24, thereby precluding any further deflection of either diaphragm and, consequently, preventing rupture or undue stressing of either diaphragm.

The disclosed embodiment is representative of a presently preferred form of the invention, but is intended to be illustrative rather than definitive thereof.

I claim:

1. A load cell construction comprising a cylindrical, magnetic body having an axial bore therethrough and an annular groove at each end thereof, said grooves forming at each end of said body a peripheral rim and a central boss surrounding said bore; a pair of electrical windings fitted one in each of said grooves; a pair of uniform magnetic diaphragms, each of said diaphragms having a flat surface at one side thereof and an annular groove in its opposite side to form a resilient web of reduced thickness; means mounting one of said diaphragms on the rim at one end of said body with its flat surface confronting the associated winding; means mounting the other of said diaphragms on the rim at the other end of said body with its flat surface confronting the other of said windings; means for applying a force on the center of one of said diaphragms to flex its web and displace said diaphragm; and force transmitting means in said bore abutting each of said diaphragms and normally spacing a portion of each of said diaphragms from the associated boss of said body to form a gap, said force transmitting means being capable of effecting flexing of the web and displacement of the other of said diaphragms in accordance with the flexing of the web and displacement of said one of said diaphragms.

2. The construction set forth in claim 1 wherein the axial length of said body between its bosses is less than the axial length of said body between its rims.

3. The construction set forth in claim 2 wherein the axial width of each of said gaps is substantially one-half the difference between said axial lengths.

4. The construction set forth in claim 1 wherein each of said diaphragms has an opening therein in alignment with said bore and through which said force applying means extends.

5. The construction set forth in claim 4 wherein said force transmitting means is tubular and accommodates said force applying means therein.

6. The construction set forth in claim 1 wherein displacement of either of said diaphragms a distance to close the gap associated therewith precludes further displacement of both of said diaphragms.

7. The construction set forth in claim 1 wherein the means mounting said diaphragms on said body are removable whereby said diaphragms may be removed from said body and replaced by other, similar diaphragms having webs of different thickness.

8. The construction set forth in claim 1 wherein the application of an axial force by said force applying means to said one of said diaphragms flexes the web thereof in such manner as to vary the width of the gap between said one diaphragm and the associated boss of said body and wherein said force transmitting means transmits said axial force to the other of said diaphragms and flexes the web thereof in such manner as to displace said other diaphragm in the same direction and to the same extent as the displacement of said one of said diaphragms, whereby one of said gaps is diminished and the other enlarged.

9. The construction set forth in claim 1 wherein the application of a lateral thrust on said one of said diaphragms by said force applying means effects flexing in one direction of said web of said one diaphragm and wherein said force transmitting means transmits said lateral force to the other of said diaphragms and flexes the web of said other diaphragm in the opposite direction.

10. In a load cell having a cylindrical body provided with an axially bored, central hub and annular grooves at each end of said body surrounding said hub and forming at each end of said body an axial boss and a peripheral rim: a pair of uniform diaphragms each of which has a flat surface at one side thereof and an annular groove in its opposite side to form a resilient web of reduced thickness; means mounting one of said diaphragms on the rim at one end of said body; means mounting the other of said diaphragms on the rim at the other end of said body; means for applying a force at the center of one of said diaphragms to flex its web and displace said diaphragm; and force transmitting means in said bore abutting each of said diaphragms and normally spacing a portion of each of said diaphragms from the associated boss of said body to form a gap, said force transmitting means being capable of effecting flexing of the web and displacement of the other of said diaphragms in accordance with the flexing of the web and displacement of said one of said diaphragms.